(12) United States Patent
Peters et al.

(10) Patent No.: US 12,043,078 B2
(45) Date of Patent: Jul. 23, 2024

(54) METHOD FOR ASCERTAINING VEHICLE CHARACTERISTIC VARIABLES

(71) Applicant: Dr. Ing. h.c. F. Porsche Aktiengesellschaft, Stuttgart (DE)

(72) Inventors: Yannik Peters, Birkenheide (DE); Matthias Stadelmayer, Geislingen an der Steige (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 590 days.

(21) Appl. No.: 17/246,790

(22) Filed: May 3, 2021

(65) Prior Publication Data

US 2021/0339596 A1 Nov. 4, 2021

(30) Foreign Application Priority Data

May 4, 2020 (DE) ...................... 10 2020 111 915.1

(51) Int. Cl.
*B60G 17/06* (2006.01)
*B60K 35/00* (2024.01)
(Continued)

(52) U.S. Cl.
CPC .............. *B60G 17/06* (2013.01); *B60K 35/00* (2013.01); *B60W 10/22* (2013.01); *B60W 40/11* (2013.01);
(Continued)

(58) Field of Classification Search
CPC .............. B60G 17/06; B60G 2400/206; B60G 2400/252; B60G 2400/61; B60G 2400/63; B60G 2400/91; B60G 2500/30; B60G 2800/01; B60G 2800/70; B60W 10/22; B60W 40/11; B60W 40/112; B60W 40/13; B60W 2040/1315; B60W 2040/1392; B60W 2510/22; B60W 2520/10; B60W 2530/10; B60W 2530/20; B60W 2540/215; B60W 2710/22; B60W 50/14; G01G 3/16; G01G 19/086; G01M 1/12; G01M 1/225;
(Continued)

(56) References Cited

U.S. PATENT DOCUMENTS 4,103,532 A * 8/1978 Buzzi ..................... G01M 17/04
73/11.08
4,913,457 A * 4/1990 Hafner ............... B60G 17/0152
280/5.514
(Continued)

FOREIGN PATENT DOCUMENTS

DE 10318005 A1 11/2004
DE 102017109651 A1 * 11/2018
(Continued)

*Primary Examiner* — John M Zaleskas
(74) *Attorney, Agent, or Firm* — Buchanan Ingersoll & Rooney PC

(57) ABSTRACT

A method for determining vehicle characteristic variables of a motor vehicle. The motor vehicle has active dampers which can set adjusting forces at the respective wheel suspensions in order to be able to raise and/or lower the body of the motor vehicle and which can also measure the acting forces. Specific predefined adjusting forces of the active dampers are imparted in order to ascertain vehicle characteristic variables from the resulting adjustment and the resulting measured forces.

12 Claims, 1 Drawing Sheet

(51) Int. Cl.
*B60W 10/22* (2006.01)
*B60W 40/11* (2012.01)
*B60W 40/112* (2012.01)
*B60W 40/13* (2012.01)
*B60W 50/14* (2020.01)
*B60K 35/22* (2024.01)
*B60K 35/26* (2024.01)

(52) U.S. Cl.
CPC ......... *B60W 40/112* (2013.01); *B60W 40/13* (2013.01); *B60W 50/14* (2013.01); *B60K 35/22* (2024.01); *B60K 35/26* (2024.01); *B60W 2040/1315* (2013.01); *B60W 2040/1392* (2013.01); *B60W 2510/22* (2013.01); *B60W 2520/10* (2013.01); *B60W 2530/10* (2013.01); *B60W 2540/215* (2020.02); *B60W 2710/22* (2013.01)

(58) Field of Classification Search
CPC . G01M 17/04; B60K 35/00; B60K 2370/152; B60K 2370/157
See application file for complete search history.

(56) References Cited

U.S. PATENT DOCUMENTS

| | | | | |
|---|---|---|---|---|
| 4,916,632 | A * | 4/1990 | Doi | G05D 19/02 |
| | | | | 280/5.515 |
| 5,042,833 | A * | 8/1991 | Kawabata | B60G 17/0185 |
| | | | | 280/5.501 |
| 5,369,974 | A * | 12/1994 | Tsymberov | G01M 17/04 |
| | | | | 73/11.08 |
| 5,619,413 | A * | 4/1997 | Oakley | B60G 17/017 |
| | | | | 280/5.514 |
| 5,825,284 | A * | 10/1998 | Dunwoody | B61F 5/245 |
| | | | | 340/440 |
| 6,161,419 | A * | 12/2000 | Langlechner | G01M 17/04 |
| | | | | 73/12.06 |
| 6,259,982 | B1 * | 7/2001 | Williams | B60G 17/016 |
| | | | | 703/8 |
| 2005/0113997 | A1 * | 5/2005 | Kim | B60G 17/0165 |
| | | | | 280/5.515 |
| 2005/0241366 | A1 * | 11/2005 | Sonnenburg | G01M 17/04 |
| | | | | 73/11.04 |
| 2006/0224285 | A1 * | 10/2006 | Izawa | B60G 11/14 |
| | | | | 701/37 |
| 2007/0029711 | A1 * | 2/2007 | Ehara | B60G 17/08 |
| | | | | 267/64.28 |
| 2008/0140285 | A1 * | 6/2008 | Sekiya | B60G 17/018 |
| | | | | 701/38 |
| 2008/0281488 | A1 * | 11/2008 | Ryu | B60G 17/016 |
| | | | | 701/38 |
| 2010/0017057 | A1 * | 1/2010 | Izawa | B60G 11/14 |
| | | | | 701/37 |
| 2011/0025000 | A1 * | 2/2011 | Inoue | B60G 17/06 |
| | | | | 280/5.507 |
| 2011/0035105 | A1 * | 2/2011 | Jolly | B60G 17/0185 |
| | | | | 701/37 |
| 2012/0022760 | A1 * | 1/2012 | Kato | B60W 10/10 |
| | | | | 701/70 |
| 2012/0035808 | A1 * | 2/2012 | Jolly | B60G 17/015 |
| | | | | 701/37 |
| 2014/0316637 | A1 * | 10/2014 | Rhode | B60G 17/0182 |
| | | | | 701/29.1 |
| 2017/0199103 | A1 * | 7/2017 | Konakai | B60G 17/08 |
| 2018/0154730 | A1 * | 6/2018 | Liebold | B60G 17/06 |
| 2018/0356312 | A1 * | 12/2018 | Weiß | G01M 17/04 |
| 2020/0180381 | A1 * | 6/2020 | Lee | B60G 17/0162 |
| 2020/0180591 | A1 * | 6/2020 | Choi | B60W 10/22 |
| 2020/0264064 | A1 * | 8/2020 | Iwama | B60G 17/052 |
| 2020/0346510 | A1 * | 11/2020 | Johansson | B60G 17/0182 |
| 2020/0369277 | A1 * | 11/2020 | Sugai | B60K 7/0007 |
| 2020/0384823 | A1 * | 12/2020 | Shukla | B60G 17/0164 |
| 2021/0291611 | A1 * | 9/2021 | Bruno | B60G 17/0165 |
| 2022/0072925 | A1 * | 3/2022 | Peters | B60G 17/01908 |
| 2022/0161627 | A1 * | 5/2022 | Laine | B60G 17/0182 |

FOREIGN PATENT DOCUMENTS

| | | | | |
|---|---|---|---|---|
| EP | 1470940 | A2 * | 10/2004 | ......... B60G 17/015 |
| JP | 07032841 | A * | 2/1995 | |

* cited by examiner

METHOD FOR ASCERTAINING VEHICLE CHARACTERISTIC VARIABLES

CROSS-REFERENCE TO RELATED APPLICATION

This application claims priority to German Patent Application No. 10 2020 111 915.1, filed May 4, 2020, which is incorporated by reference herein in its entirety.

FIELD OF THE INVENTION

The invention relates to a method for ascertaining vehicle characteristic variables.

BACKGROUND OF THE INVENTION

In motor vehicles, a wide variety of characteristic variables can be ascertained, for example vehicle speed, vehicle acceleration, vehicle weight etc. The motor vehicle has measuring devices and also display devices provided for some of these vehicle characteristic variables, because the knowledge thereof is important for the operation of the motor vehicle and it is also important that the driver knows these vehicle characteristic variables, for example the vehicle speed. In the case of other vehicle characteristic variables, some drivers may be interested to know these, for example the vehicle acceleration. Such vehicle characteristic variables therefore cannot be ascertained and displayed in every motor vehicle.

Also, numerous vehicle characteristic variables cannot be ascertained in typical motor vehicles, even if it were indeed considered expedient if these vehicle characteristic variables were to be utilized or influenced, for example spring characteristic curves, vertical natural frequencies, roll and pitch frequencies etc.

SUMMARY OF THE INVENTION

Described herein is a method for ascertaining vehicle characteristic variables, which method makes use of components which are available in the motor vehicle, such that an inexpensive means of ascertaining such vehicle characteristic variables is created.

An exemplary embodiment of the invention relates to a method for determining vehicle characteristic variables of a motor vehicle, wherein the motor vehicle has active dampers which can set adjusting forces at the respective wheel suspensions in order to be able to raise and/or lower the body of the motor vehicle and which can measure the acting forces, wherein specific predefined adjusting forces of the active dampers are imparted in order to ascertain a vehicle characteristic variable from the resulting adjustment and the resulting measured forces. In this way, through targeted actuation of the dampers in order to effect body movements, a defined determination of vehicle characteristic variables can be effected. Here, the effected body movements may be so small that they are not or scarcely perceptible to the driver or to the vehicle occupants.

It is particularly advantageous if a raising, pitching and/or rolling of the body of the motor vehicle is effected by means of the imparted adjusting forces. In this way, the body of the motor vehicle is caused in a defined manner to perform movements that can be detected by means of the sensors integrated into the dampers.

It is also advantageous if the method for determining vehicle characteristic variables is executed in specific measurement operating situations of the motor vehicle, in particular when the motor vehicle is at a standstill. It is thus achieved that the method is executed only when the motor vehicle is in a safe operating situation, for example at vehicle speeds below 50 km/h or even at a standstill. Also, the execution of the method at vehicle speeds greater than zero may be restricted to predefined route conditions, for example only on substantially straight and substantially flat routes. In the case of execution at a standstill, requirements may also be placed on the parking location, for example in a workshop, in a predefined parking location, in a home parking location etc.

It is also advantageous if the method for determining vehicle characteristic variables is executed only after prior initiation and/or confirmation by the driver of the motor vehicle, and/or in that the method for determining vehicle characteristic variables is executed in predefined parking locations and/or during travel through predefined route positions. It is thus achieved that the method is executed only when the driver of the motor vehicle is prepared for it and/or has consented to it, which serves overall to establish safety.

It is particularly advantageous if the ascertainable vehicle characteristic variable is one of the following vehicle characteristic variables: a spring characteristic curve of a respective spring-damper strut, friction of a respective spring-damper strut, vertical natural frequency, vehicle mass, roll frequency, pitch frequency, center of gravity position in a vehicle longitudinal direction, center of gravity position in a vehicle transverse direction, center of gravity position in a vehicle vertical direction, imbalance of a respective wheel, rotation resistance of a respective wheel, wheel natural frequency.

According to one advantageous concept, at least one vehicle characteristic variable is, or the ascertained vehicle characteristic variables are, output to the driver, in particular visually on a display or acoustically. The acoustic indication may be performed by the outputting of a warning tone and/or by speech output.

It is particularly advantageous if the ascertained vehicle characteristic variables are transmitted to a control unit and/or a control program in order to perform control of the motor vehicle on the basis of at least one of the vehicle characteristic variables. In this way, on the basis of the ascertained vehicle characteristic variables, the control of the motor vehicle can be adapted to the actual state of the motor vehicle, such that there is no need to resort to standard preset characteristic variables.

It is particularly advantageous if the actuation of the dampers is set on the basis of the ascertained vehicle characteristic variables, in particular in specific driving programs and/or in specific driving situations. It is thus possible in specific driving situations to achieve greater safety, in particular in the limit range of the motor vehicle.

BRIEF DESCRIPTION OF THE DRAWINGS

Below, the invention will be discussed in detail on the basis of an exemplary embodiment and with reference to the drawing. In the drawing.

DETAILED DESCRIPTION OF THE INVENTION

Figure 1:
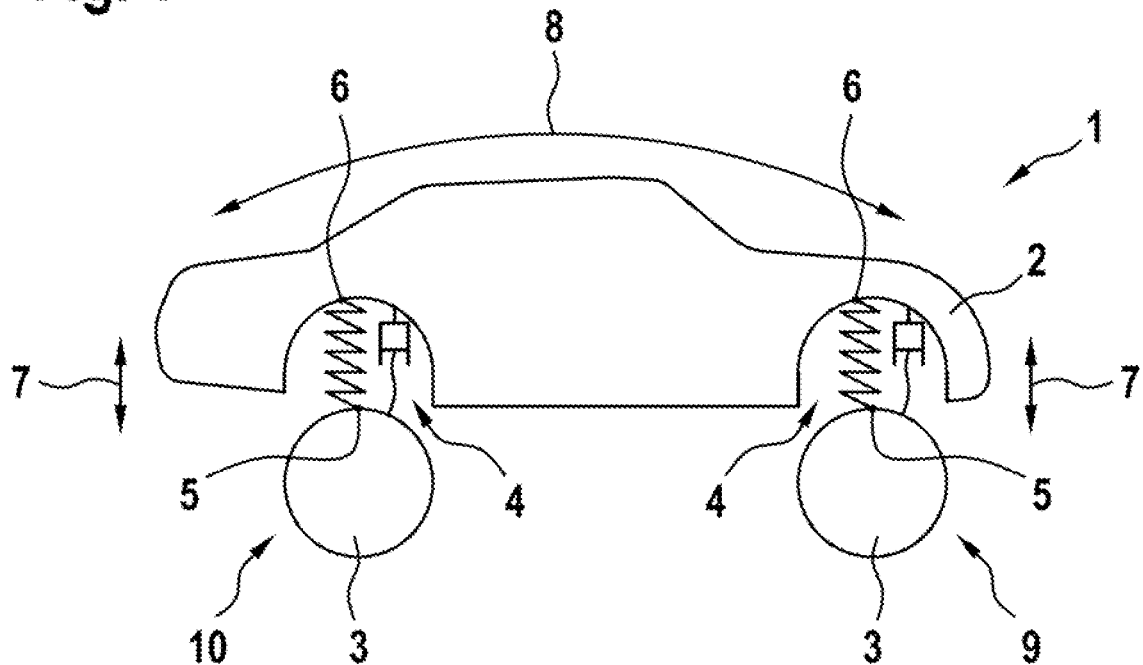
FIG. 1 shows a schematic view of a motor vehicle.

FIG. 1 shows a motor vehicle 1 with a body 2 and with wheels 3, wherein the wheels 3 are connected to the body 2 in adjustable fashion by means of active dampers 4. Here, the active dampers 4 engage at one side on a wheel suspension 5 or on a wheel carrier and at the other side on a body articulation point 6.

By means of an active damper 4, adjusting forces can be set at the respective wheel suspensions 5 in order to raise and/or lower the body 2 of the motor vehicle 1.

Here, the active dampers 4 also have integrated sensors, which can for example detect the acting force and optionally also the adjustment travel and/or the present adjustment position.

In the method for ascertaining vehicle characteristic variables, specific predefined adjusting forces of the active dampers 4 are imparted in order to ascertain a vehicle characteristic variable from the resulting adjustment and the resulting measured forces.

By means of the actuation of the active dampers 4, a raising, pitching and/or rolling of the body 2 of the motor vehicle can be effected by means of the imparted adjusting forces, see the arrows 7, 8.

Here, a raising means a lifting movement of the body 2 as a whole, in particular to substantially the same extent at the front and at the rear on the motor vehicle 1 or at the front axle 9 and at the rear axle 10.

Furthermore, a pitching means an oscillating movement about an axis lying parallel to the vehicle transverse direction, such that the motor vehicle 1 is moved up and down at the front in a manner opposite to an up-and-down movement at the rear.

Furthermore, a rolling means an oscillating movement about an axis lying parallel to the vehicle longitudinal direction, such that the motor vehicle 1 is moved up and down on the driver's side in a manner opposite to an up-and-down movement on the front-passenger side.

For the safe execution of the method for determining vehicle characteristic variables, the method may for example be carried out only in specific measurement operating situations of the motor vehicle 1. This may occur in particular when the motor vehicle 1 is at a standstill or at low vehicle speeds, in particular below 50 km/h.

It can also increase safety if the method for determining vehicle characteristic variables is executed, in particular only, after prior initiation and/or confirmation by the driver of the motor vehicle, and/or in that the method for determining vehicle characteristic variables is executed, in particular only, in predefined parking locations and/or during travel through predefined route positions. It is thus achieved that predefined safety conditions must be present in order to be able to execute the method.

It is particularly advantageous if the ascertainable vehicle characteristic variable is one of the following vehicle characteristic variables: a spring characteristic curve of a respective spring-damper strut, friction of a respective spring-damper strut, vertical natural frequency, vehicle mass, roll frequency, pitch frequency, center of gravity position in a vehicle longitudinal direction, center of gravity position in a vehicle transverse direction, center of gravity position in a vehicle vertical direction, imbalance of a respective wheel, rotation resistance of a respective wheel, wheel natural frequency.

The determination of the spring characteristic curves of a respective spring-damper strut 4 and the determination of the friction of a respective spring-damper strut 4 may be carried out for each spring-damper strut 4 at one of the wheels 3.

Figure 2:
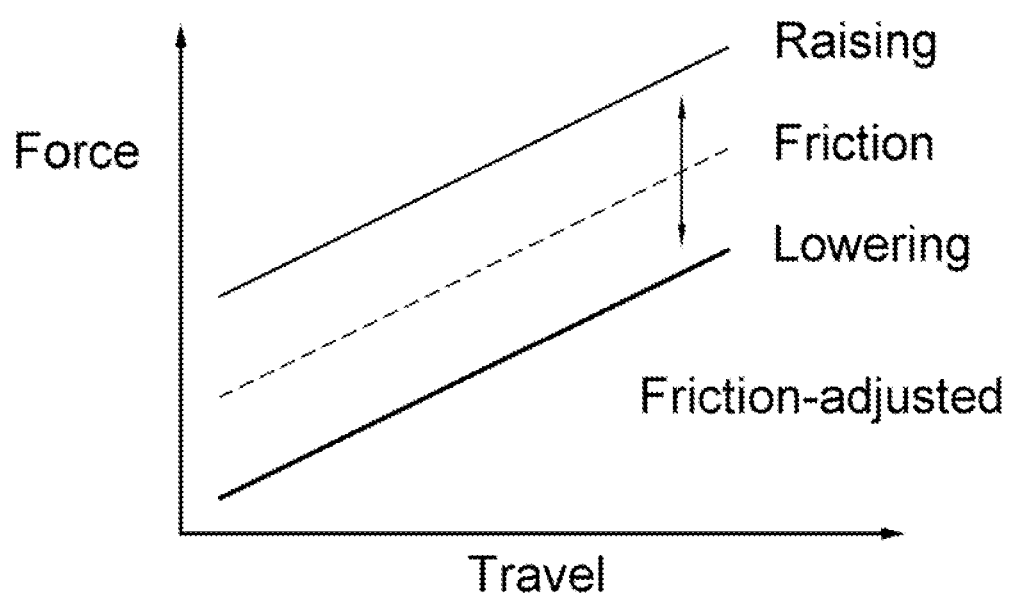
FIG. 2 shows a diagram for explanation of the method according to aspects of the invention.

FIG. 2 shows the measurement of the force as a function of the travel in the case of such a determination of the spring characteristic curve. Here, the difference in the forces between the force during raising and the force during lowering gives rise to the hysteresis, from which the friction can be ascertained.

For the determination of the spring characteristic curve or the spring characteristic curves and the friction of the spring-damper strut 4 at the wheels 3, a vertical up-and-down movement is imparted at the dampers 4 of all of the wheels 3. Here, the forces of the active dampers 4 required for this are ascertained as a function of the adjustment travel, and from these a spring characteristic curve can be ascertained, wherein, from this respective spring characteristic curve for each damper 4, it is also possible to ascertain the hysteresis, from which the friction can be ascertained for each damper 4. The respective spring characteristic curve is thus ascertained from a directly measured relationship of force and travel, and the friction is ascertained from the width of the hysteresis band.

The determination of the vertical natural frequency and of the vehicle mass can be performed as follows: The body is raised and allowed to fall so as to effect a vertical reciprocating movement. The natural frequency of the body can be ascertained from this. The occurring oscillating movement with damping can thus be evaluated, such that, with the spring constants from the spring characteristic curve and the friction, the body natural frequency and the vehicle mass can be ascertained. The natural frequency can be ascertained by means of a frequency analysis of the occurring oscillating movement. The vehicle mass can be ascertained from the relationship f~√(/), with the spring stiffness c of the spring constants. The frequency f is measured. The vehicle mass m can thus be estimated.

The roll/pitch natural frequency can thus be ascertained: Rolling/pitching movement inducement is performed, and the body is allowed to oscillate in as far as possible undamped fashion. The roll or pitch natural frequency is ascertained from this. The roll natural frequency is ascertained by means of the rolling movement inducement and a frequency analysis of the occurring undamped oscillation. The pitch natural frequency is ascertained by means of the pitching movement inducement and a frequency analysis of the occurring undamped oscillation.

The center of gravity position in the vehicle longitudinal direction (x) and in the vehicle transverse direction (y) respectively is ascertained as follows: A vertical reciprocating movement, with falling and braking of the falling movement by the dampers, is imparted. From the forces ascertained during the braking for each wheel, together with the spring stiffnesses, the respective friction and the damping, it is possible for the respective center of gravity position in the x direction and in the y direction to be ascertained. The center of gravity position in the x direction: The force required for braking the body falling movement of the body and the associated acceleration are measured on an axle-specific basis, that is to say for the front axle and the rear axle. From =•, the axle load is calculated, and from this the center of gravity position in the x direction can be ascertained. The center of gravity position in y: The force required for braking the body falling movement of the body and the associated acceleration are measured on a right-left split basis, that is to say for the driver's side and the front-passenger side. From =•, the side load is calculated, and from this the center of gravity position in the y direction can be ascertained.

The center of gravity position in the vehicle vertical direction (z) is ascertained as follows: Steady-state pitching/rolling is imparted by means of the dampers 4. From this, the acting forces are measured. By means of the geometrical relationship of pitch/roll angle and the steady-state wheel load shift, the height of the center of gravity is calculated. For this purpose, by means of the forces and by means of the vehicle weight and the spring stiffnesses, the center of gravity position in the z direction is ascertained.

The determination of imbalances or rotation resistances is performed as follows: A single wheel 3 is raised and is driven for example by means of a wheel-specific motor. From the rotational speed and the fluctuation thereof and acting forces, a detection of possible imbalances can be performed by means of the damper 4. At an axle which is further remote from the center of gravity, single wheels 3 can be raised and driven. From =(•²)/, an imbalance yields a force or vibration which is periodic with the rotational speed and which can be measured by means of the damper 4. Brake/bearing friction can be measured directly from the required drive torque.

The determination of the wheel natural frequency can be performed as follows: A single wheel 3 can be raised and allowed to fall. The natural frequency can be performed by means of a frequency analysis of the occurring oscillating movement.

In one advantageous exemplary embodiment, the ascertained vehicle characteristic variables may be output to the driver, in particular visually on a display or acoustically. The driver can thus be made aware of the ascertained values.

It is also advantageous if the ascertained vehicle characteristic variables are transmitted to a control unit and/or a control program in order to perform control of the motor vehicle on the basis of at least one of the vehicle characteristic variables.

Correspondingly, the actuation of the dampers 4 can be set on the basis of the ascertained vehicle characteristic variables, in particular in specific driving programs and/or in specific driving situations.

LIST OF REFERENCE DESIGNATIONS

1 Motor vehicle
2 Body
3 Wheel
4 Damper
5 Wheel suspension
6 Body articulation point
7 Arrow
8 Arrow
9 Front axle
10 Rear axle

What is claimed:

1. A method for determining vehicle characteristic variables of a motor vehicle that has a plurality of active dampers configured to set adjusting forces at wheel suspensions in order to raise and/or lower a body of the motor vehicle, said method comprising:
voluntarily activating the active dampers to impart specific predefined adjusting forces at the wheel suspensions while the motor vehicle is at a standstill;
measuring acting forces at the wheel suspensions resulting from the specific predefined adjusting forces imparted by the activated active dampers; and
ascertaining at least one vehicle characteristic variable among the vehicle characteristic variables as a function of the specific predefined adjusting forces and the measured acting forces,
where the at least one vehicle characteristic variable is at least one of: center of gravity position in a vehicle longitudinal direction, center of gravity position in a vehicle transverse direction, or center of gravity position in a vehicle vertical direction.

2. The method as claimed in claim 1, wherein voluntarily activating the active dampers causes raising, pitching and/or rolling of the body of the motor vehicle.

3. The method as claimed in claim 1, wherein, prior to voluntarily activating the active dampers, the method further comprises either (i) receiving instructions from a driver of the motor vehicle to initiate the method, or (ii) confirming with the driver that the method can proceed.

4. The method as claimed in claim 1, further comprising ascertaining at least one second vehicle characteristic variable among the vehicle characteristic variables as a function of the specific predefined adjusting forces and the measured acting forces, wherein the at least one second vehicle characteristic variable is at least one of the following vehicle characteristic variables: a spring characteristic curve of a respective damper, friction of a respective damper, vertical natural frequency, vehicle mass, roll frequency, pitch frequency, imbalance of a respective wheel, rotation resistance of a respective wheel, and wheel natural frequency.

5. The method as claimed in claim 1, further comprising outputting the at least one vehicle characteristic variable to a driver of the motor vehicle either visually on a display or acoustically.

6. The method as claimed in claim 1, further comprising transmitting the at least one vehicle characteristic variable to a control unit and/or a control program in order to perform control of the motor vehicle on the basis of the at least one vehicle characteristic variable.

7. The method as claimed in claim 1, further comprising actuating the active dampers on the basis of the at least one vehicle characteristic variable in specific driving programs and/or in specific driving situations.

8. The method as claimed in claim 1, further comprising actuating the active dampers based on the at least one vehicle character variable in predefined parking locations.

9. The method as claimed in claim 1, further comprising actuating the active dampers based on the at least one vehicle character variable during travel through predefined route positions.

10. The method as claimed in claim 1, wherein the center of gravity position in the vehicle longitudinal direction is determined by imparting a vertical reciprocating movement, with falling and braking of a falling movement by the active dampers, and measuring a force required for braking the falling movement of the body of the motor vehicle and an associated acceleration on an axle-specific basis.

11. The method as claimed in claim 1, wherein the center of gravity position in the vehicle transverse direction is determined by imparting a vertical reciprocating movement, with falling and braking of a falling movement by the active dampers, and measuring a force required for braking the falling movement of the body of the motor vehicle and an associated acceleration on a right-left split basis.

12. The method as claimed in claim 1, wherein the center of gravity position in the vehicle vertical direction is determined by imparting steady-state pitching and/or rolling movement of the body of the motor vehicle by the active dampers, and measuring an active force required for the steady-state pitching and/or rolling movement of the body of the motor vehicle, a weight of the motor vehicle, and spring stiffnesses.

* * * * *